(12) United States Patent
Le-Goff et al.

(10) Patent No.: US 10,406,496 B2
(45) Date of Patent: Sep. 10, 2019

(54) SYSTEMS AND METHODS FOR IMPROVING FLOW IN RADIAL FLOW REACTOR

(71) Applicants: Woven Metal Products, Inc., Alvin, TX (US); Axens SA, Rueil-Malmaison (FR)

(72) Inventors: Pierre-Yves Le-Goff, Rueil-Malmaison (FR); Fabian Lambert, Rueil-Malmaison (FR); Matthew Hutchinson, Princeton, NJ (US); Russell Hillenburg, Alvin, TX (US); Eugene Eberhardt, Alvin, TX (US)

(73) Assignees: Woven Metal Products, Inc., Alvin, TX (US); Axens SA, Rueil-Malmaison (FR)

( * ) Notice: Subject to any disclaimer, the term of this patent is extended or adjusted under 35 U.S.C. 154(b) by 0 days.

(21) Appl. No.: 15/649,893

(22) Filed: Jul. 14, 2017

(65) Prior Publication Data
US 2019/0015807 A1    Jan. 17, 2019

(51) Int. Cl.
*B01D 53/00* (2006.01)
*B01D 53/02* (2006.01)
(Continued)

(52) U.S. Cl.
CPC ........ *B01J 8/0085* (2013.01); *B01D 53/0431* (2013.01); *B01D 53/0446* (2013.01);
(Continued)

(58) Field of Classification Search
CPC ........ B01D 53/00; B01D 53/02; B01D 53/04; B01D 53/0407; B01D 53/0431;
(Continued)

(56) References Cited

U.S. PATENT DOCUMENTS 3,027,244 A * 3/1962 Byrne .................. B01J 8/0214
                                                    208/146
4,374,094 A * 2/1983 Farnham ................ B01J 8/008
                                                    208/146
(Continued)

FOREIGN PATENT DOCUMENTS

DE          3111892 A1    10/1982
GB          484455 A       5/1938

OTHER PUBLICATIONS

Notification of Transmittal of the International Search Report and Written Opinion filed in application PCT/US2017/037734, dated Aug. 21, 2017.

*Primary Examiner* — Natasha E Young
(74) *Attorney, Agent, or Firm* — Blank Rome LLP

(57) ABSTRACT

A scallop, center pipe, and outer basket for use in a radial flow reactor are provided. Each of the scallop, the center pipe, and the outer basket is formed of an elongated conduit having a top end and an opposing bottom end, and a plurality of openings formed in the elongated conduit through a thickness thereof. A diameter of the plurality of openings progressively increases or decreases from the top end to the opposing bottom end of the elongated conduit so as to allow a feedstock to flow radially out through the plurality of openings on the scallop or outer basket, or to allow a feedstock to flow uniformly into the center pipe through the plurality of openings. A system utilizing the center pipe together with either the scallop or the outer basket is also provided.

21 Claims, 8 Drawing Sheets

(51) Int. Cl.

| | | |
|---|---|---|
| *B01D 53/04* | (2006.01) | |
| *B01J 8/00* | (2006.01) | |
| *B01J 8/02* | (2006.01) | |
| *B01J 8/18* | (2006.01) | |
| *B01J 8/24* | (2006.01) | |
| *B01J 8/44* | (2006.01) | |
| *B01J 19/00* | (2006.01) | |
| *B01J 19/24* | (2006.01) | |
| *B01J 19/30* | (2006.01) | |

(52) U.S. Cl.
CPC .............. *B01J 8/009* (2013.01); *B01J 8/0214* (2013.01); *B01J 8/0278* (2013.01); *B01J 8/1872* (2013.01); *B01J 8/44* (2013.01); *B01J 8/1809* (2013.01); *B01J 2208/0092* (2013.01); *B01J 2208/00548* (2013.01); *B01J 2208/00884* (2013.01); *B01J 2208/00938* (2013.01); *B01J 2219/18* (2013.01); *B01J 2219/1943* (2013.01)

(58) Field of Classification Search
CPC ......... B01D 53/0446; B01J 8/00; B01J 8/008; B01J 8/0085; B01J 8/009; B01J 8/02–0214; B01J 8/0278; B01J 8/18; B01J 8/1809; B01J 8/1872; B01J 8/24; B01J 8/44; B01J 19/00; B01J 19/24; B01J 19/30; B01J 19/305; B01J 2208/00796; B01J 2208/00884; B01J 2219/18; B01J 2219/19; B01J 2219/194; B01J 2219/1941; B01J 2219/1943

See application file for complete search history.

(56) References Cited

U.S. PATENT DOCUMENTS

| | | | |
|---|---|---|---|
| 4,923,108 A | | 5/1990 | Cordell |
| 4,977,119 A | * | 12/1990 | Koves ..................... B01J 8/125 208/140 |
| 5,118,419 A | | 6/1992 | Evans et al. |
| 5,209,908 A | | 5/1993 | Koves et al. |
| 5,366,704 A | | 11/1994 | Koves et al. |
| 6,224,838 B1 | * | 5/2001 | Schulz .................... B01J 8/0085 422/216 |
| 7,214,352 B2 | * | 5/2007 | Poussin .................... B01J 8/008 422/218 |
| 7,226,568 B1 | | 6/2007 | Ham et al. |
| 8,313,561 B2 | * | 11/2012 | Celik ................. B01D 53/0431 95/96 |

* cited by examiner

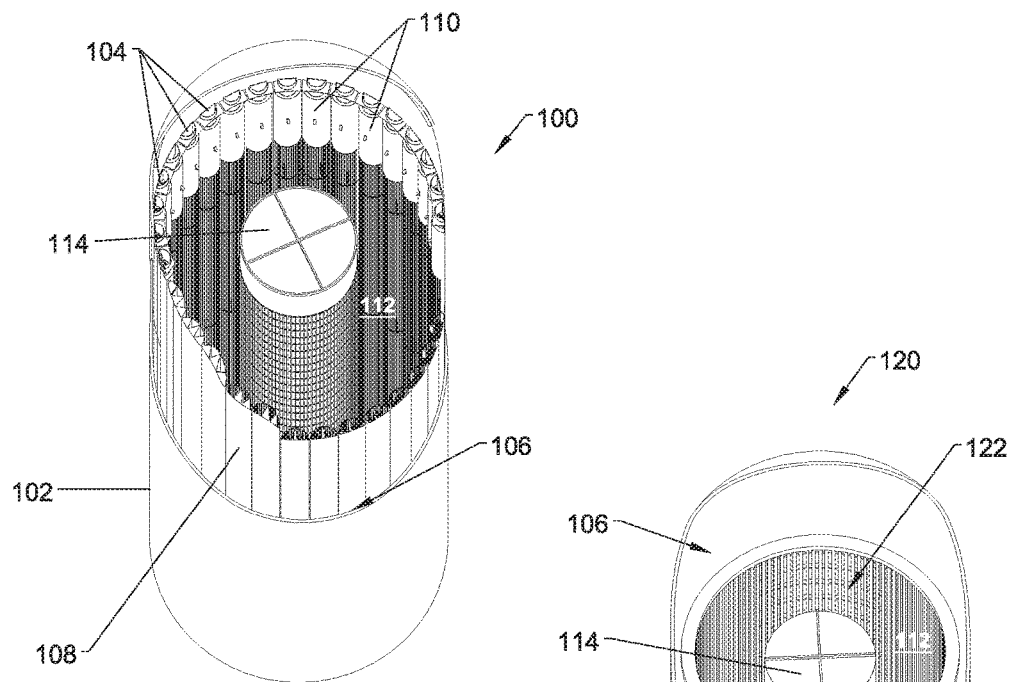
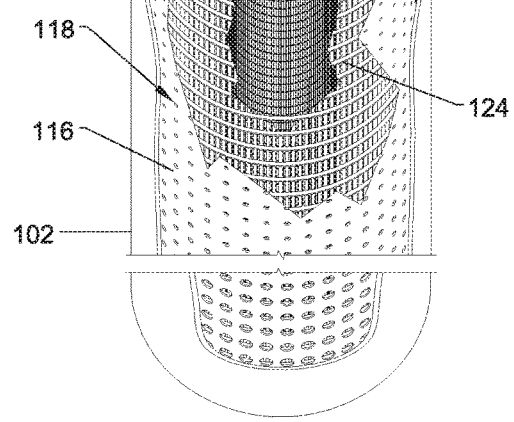
FIG. 1A
FIG. 1B

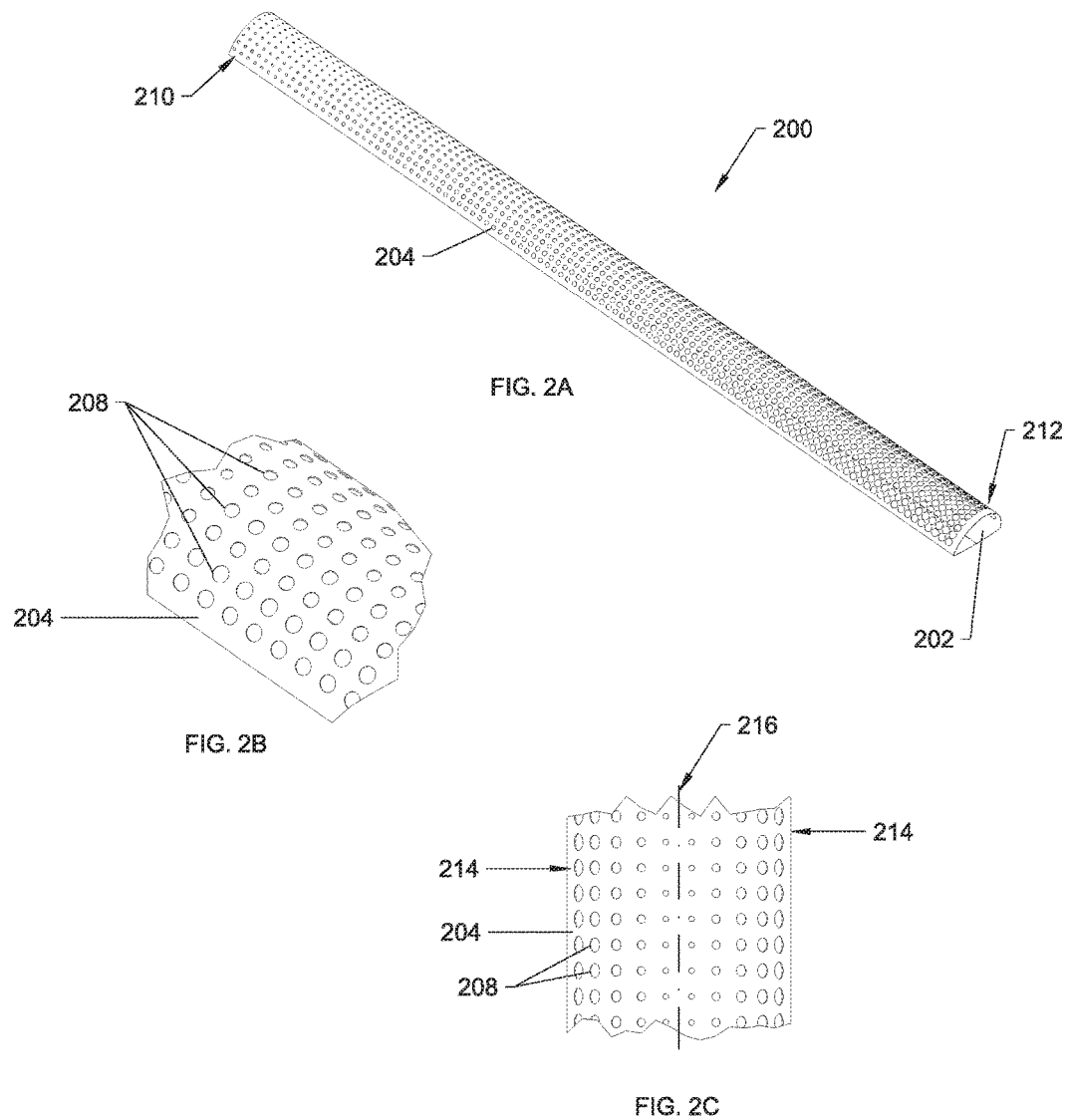

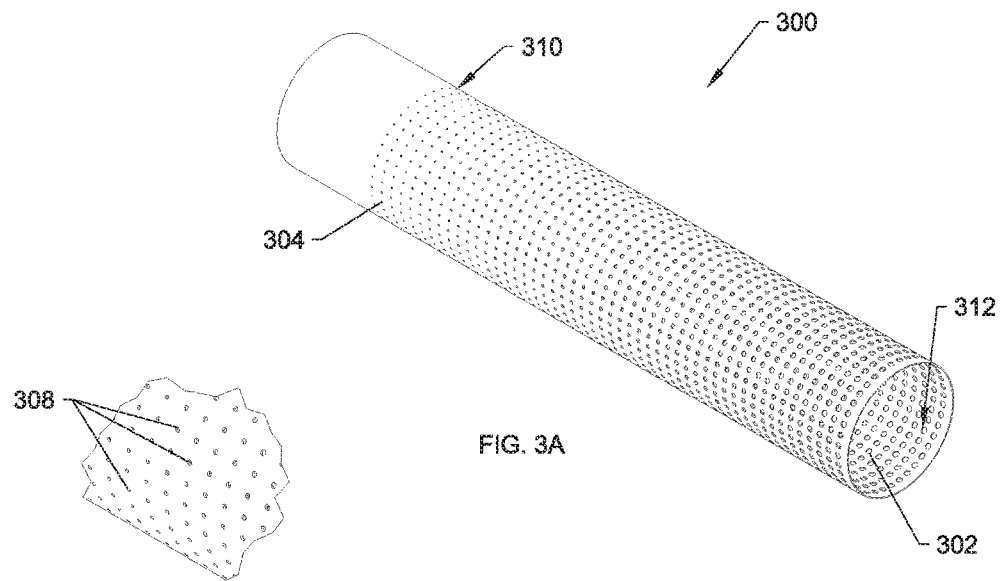
FIG. 3A
FIG. 3B
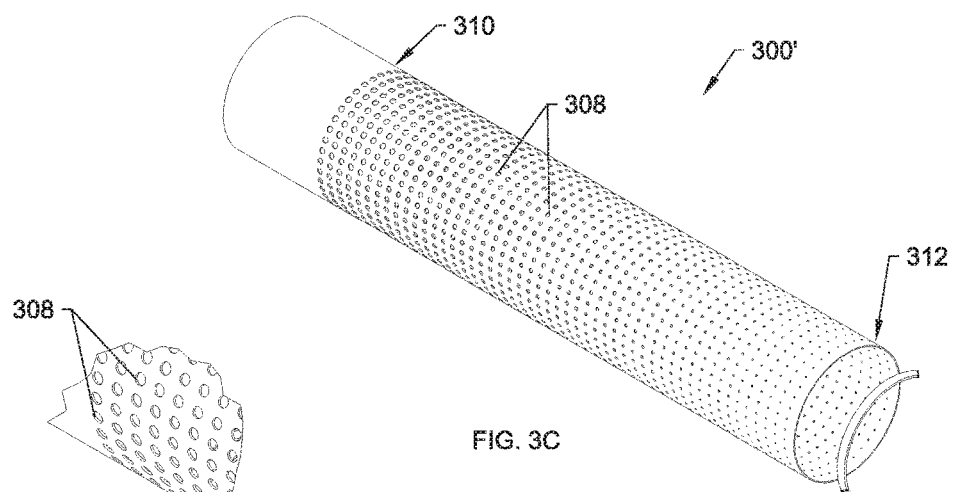
FIG. 3C
FIG. 3D

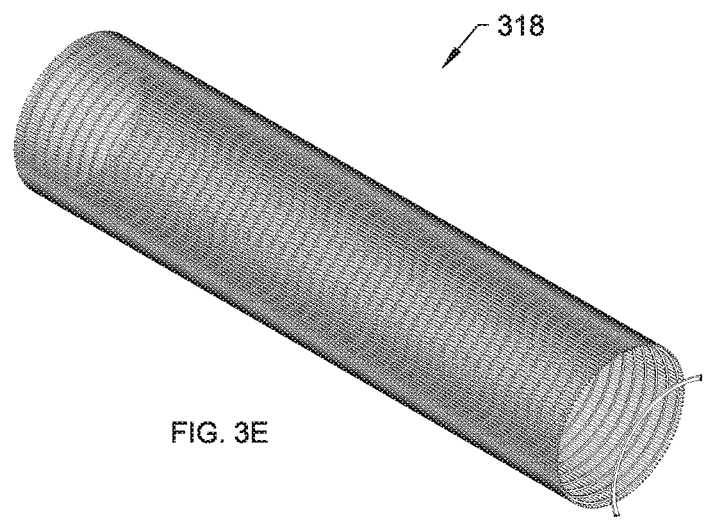
FIG. 3E
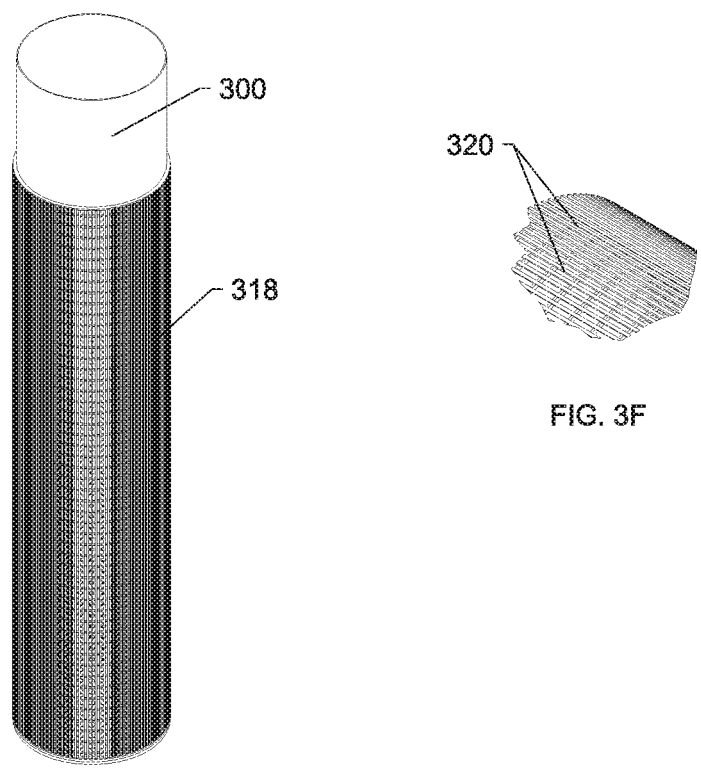
FIG. 3F
FIG. 3G

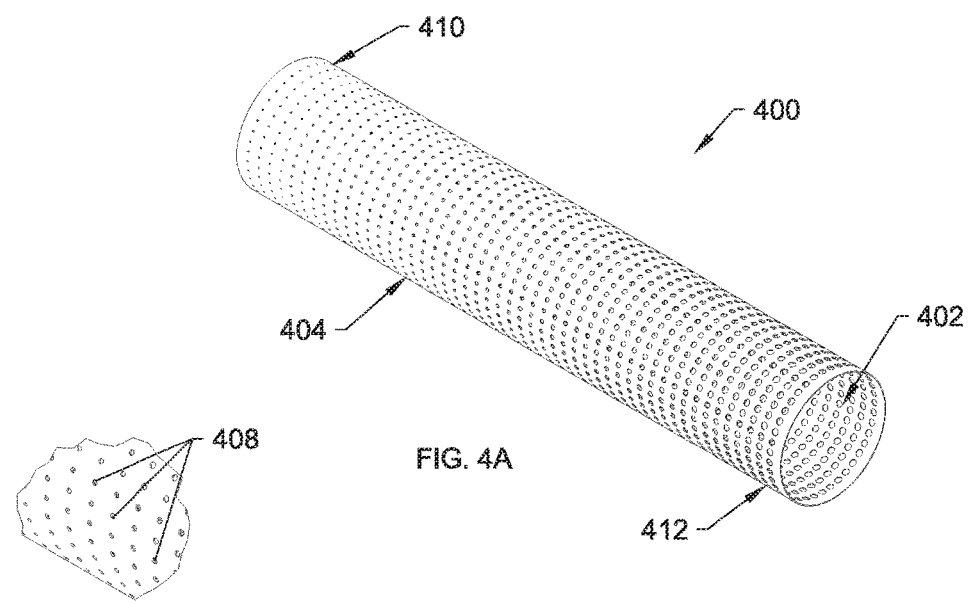
FIG. 4A
FIG. 4B
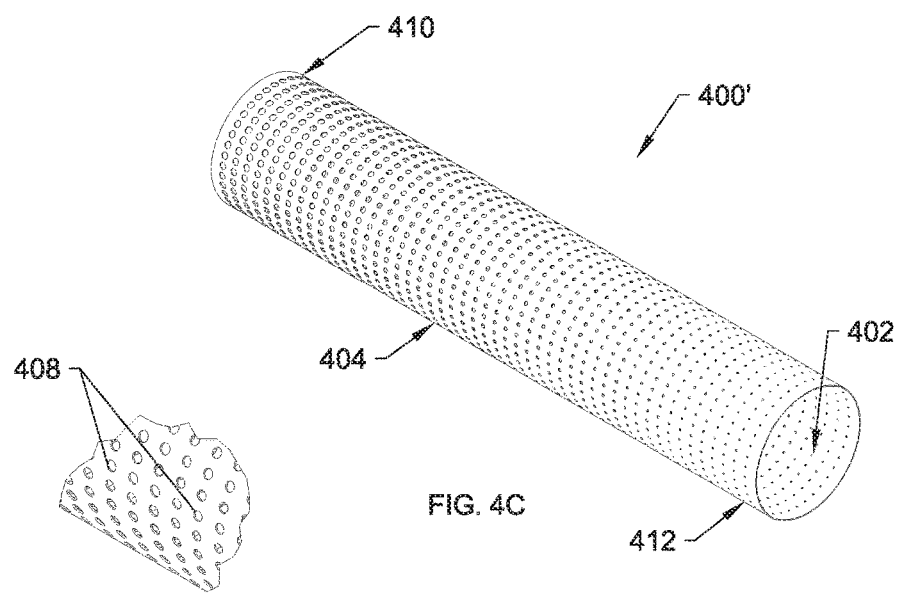
FIG. 4C
FIG. 4D

SYSTEMS AND METHODS FOR IMPROVING FLOW IN RADIAL FLOW REACTOR

FIELD OF THE INVENTION

The invention relates to various systems and methods of improving the flow of gas, vapors, or liquids through a radial flow reactor to optimize the catalyst reaction and catalyst life.

BACKGROUND OF THE INVENTION

In refining chemical and petrochemical applications, conventional scallops are used in radial flow reactors and function as conduits through which gases, vapors or liquids (hereinafter referred to collectively as "G-V-L" or "feedstock") flow inside the reactor vessel. Scallops are typically formed as elongated, tube-shaped conduits of various geometry, typically having a cross-sectional "D" shape (although other shapes are also used), through which G-V-L flow radially in an inward or outward direction relative to the vessel. The scallops are typically formed of various metal constructions, sometimes having openings on a surface thereof to allow the G-V-L to flow freely through the surface of the scallop, as well as along the length of the scallop. When the G-V-L flows through the scallop and escape through the openings on the surface, it comes into contact with catalyst particles contained within an adjacent catalyst bed (annulus space), thus causing a reaction to take place. In use, the scallops are placed adjacent to one another along the inner circumference of the wall of the reactor vessel. Scallops in the art have generally used holes of uniform size and distribution over the body of the scallop.

In refining chemical and petrochemical applications in radial flow reactors, conventional outer baskets may also be used in place of, or in addition to, the scallops discussed above. These outer baskets provide the same function as the scallops, i.e., as conduits through which G-V-L flow inside the reactor vessel. Outer baskets are typically formed as one continuous basket, such as a cylindrical-shaped conduit of various geometry, through which G-V-L flow radially in an inward or outward direction relative to the vessel. The outer basket is typically formed of various metal constructions, sometimes having openings on a surface thereof to allow the G-V-L to flow freely through the surface of the outer basket, as well as along the length of the outer basket. When the G-V-L flows through the outer basket and escapes through the openings on the surface, it comes into contact with catalyst particles contained within an adjacent catalyst bed (annulus space), thus causing a reaction to take place. In use, the outer basket is placed along the inner circumference of the wall of the reactor vessel. Outer baskets in the art have generally used profile wire with various wire slot openings of uniform size and distribution over the body of the outer basket.

Likewise, conventional center pipes are also used in radial flow reactors and function as conduits through which G-V-L flow inside the reactor vessel. Center pipes are typically formed as one continuous cylinder, through which G-V-L flow radially in an inward or outward direction relative to the vessel. The center pipe is typically formed of various metal constructions, sometimes having openings on a surface thereof to allow the G-V-L to flow freely through the surface of the center pipe, as well as along the length of the center pipe. When the G-V-L flows through the adjacent catalyst bed, the center pipe acts as the collection/outlet device after the reaction has taken place. In use, the center pipes are placed directly in the center of the reactor to create a uniform annulus for the catalyst bed of the reactor vessel. Center pipes in the art generally have holes of uniform size and distribution over the surface of the center pipe to hydraulically control the adjacent catalyst bed. The center pipe is then generally wrapped with a wire mesh or profile wire material for the purpose of catalyst containment.

One common problem with such designs is that as the G-V-L enters the scallop or outer basket, a higher volume of the G-V-L outflows through the openings of the scallop or outer basket where the pressure drop of the system is lower. This difference in flow could be seen in both the axial and radial directions. This uneven flow distribution through and along the scallop or outer basket, results in an uneven utilization of the catalyst in the catalyst bed. Specifically, the top part of the catalyst bed is prone to be utilized more quickly, while the bottom part of the catalyst bed is slow to be utilized. This can cause a number of problems, most significantly (and costly) that the uneven flow distribution reduces the resulting reaction efficiency of the vessel.

Accordingly, systems and methods of improving the flow distribution of G-V-L through the reactor vessel are needed, in order to increase reaction efficiency, catalyst activity, and catalyst bed uniformity, so as to extend the lifespan of the catalyst, and to increase reactor equipment efficiencies and ancillary equipment performance. More specifically, a system that causes a more uniform pressure drop and therefore G-V-L flow in the reactor system is desired.

SUMMARY OF THE INVENTION

To solve this problem, the invention provides modified scallops, center pipes, and outer baskets for use in a radial flow reactor which manipulate the flow of G-V-L through the reactor vessel to optimize the catalyst reaction.

The invention is directed to a scallop for use in a radial flow reactor which includes an elongated conduit having a top end and an opposing bottom end, and a plurality of openings formed in the elongated conduit through a thickness thereof. A diameter of the plurality of openings progressively increases or decreases from the top end to the opposing bottom end of the elongated conduit so as to allow a feedstock to flow uniformly out of the scallop through the plurality of openings.

The invention also provides a scallop for use in a radial flow reactor which includes an elongated conduit having a top end, an opposing bottom end, and opposing sides, and a plurality of openings formed in the elongated conduit through a thickness thereof. A diameter of the plurality of openings progressively increases or decreases from a centerline of the elongated conduit to each of the opposing sides, so as to allow a feedstock to flow uniformly out of the scallop through the plurality of openings.

The invention is also directed to a center pipe for use in a radial flow reactor which includes an elongated conduit having a top end and an opposing bottom end, and a plurality of openings formed in the elongated conduit through a thickness thereof. A diameter of the plurality of openings progressively increases or decreases from the top end to the opposing bottom end of the elongated conduit so as to allow a feedstock to flow uniformly into the center pipe through the plurality of openings.

The invention further provides an outer basket for use in a radial flow reactor which includes an elongated conduit having a top end and an opposing bottom end, and a plurality of openings formed in the elongated conduit through a thickness thereof. A diameter of the plurality of openings progressively increases or decreases from the top end to the opposing bottom end of the elongated conduit so as to allow a feedstock to flow uniformly out of the outer basket through the plurality of openings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A is a cross-sectional top view of a radial flow reactor vessel utilizing scallops in accordance with an embodiment of the invention;

FIG. 1B is a cross-sectional top view of a radial flow reactor vessel utilizing an outer basket in accordance with an embodiment of the invention;

FIG. 2A is a perspective view of a scallop for use in a reactor vessel in accordance with an embodiment of the invention, representing an opening gradient of small to large, from top to bottom, respectively;

FIG. 2B is an enlarged view of the scallop illustrated in FIG. 2A taken along line A;

FIG. 2C is an enlarged front view of the scallop illustrated in FIG. 2A along the scallop centerline;

FIG. 3A is a perspective view of a center pipe according to an embodiment of the invention representing an opening gradient of small to large, from top to bottom, respectively;

FIG. 3B is an enlarged view of the center pipe illustrated in FIG. 3A taken along line C;

FIG. 3C is a perspective view of a center pipe according to an embodiment of the invention representing an opening gradient or large to small, from top to bottom, respectively;

FIG. 3D is an enlarged view of the center pipe illustrated in FIG. 3C taken along line D;

FIG. 3E is a perspective view of a profile wire center pipe overlay for use with a center pipe according to an embodiment of the invention;

FIG. 3F is an enlarged view of the profile wire center pipe overlay illustrated in FIG. 3E, taken along line E;

FIG. 3G is a perspective view of the profile wire center pipe overlay of FIG. 3E installed with the center pipe of FIG. 3A or FIG. 3C according to an embodiment of the invention;

FIG. 4A is a perspective view of an outer basket according to an embodiment of the invention representing an opening gradient of small to large, from top to bottom, respectively;

FIG. 4B is an enlarged view of the outer basket of FIG. 4A, taken along line F;

FIG. 4C is a perspective view of an outer basket according to an embodiment of the invention representing an opening gradient of large to small, from top to bottom, respectively;

FIG. 4D is an enlarged view of the outer basket of FIG. 4C, taken along line G;

DETAILED DESCRIPTION

Figure 2D:
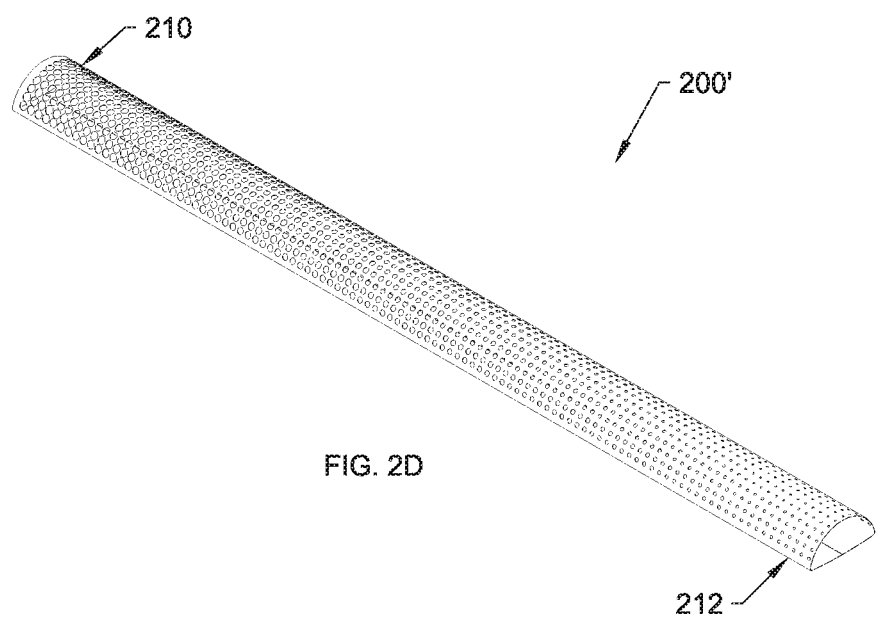
FIG. 2D is a perspective view of a scallop for use in a reactor vessel in accordance with an embodiment of the invention, representing an opening gradient of large to small from top to bottom, respectively.

The invention provides systems and methods of improving flow distribution of gases, vapors, and liquids (hereinafter collectively referred to as "G-V-L" or "feedstock") through the reactor vessel to reduce or eliminate known problems associated with uneven flow. The systems and methods set forth herein: (1) reduce the occurrence of coking which can cause downstream catalyst restriction (plugging transfer lines), and which in turn reduces the catalyst surface temperature during regeneration, thus increasing catalyst and equipment life, (2) reduce the occurrence of hot and cold spots within the reactor vessel, particularly on the reactor walls, which in turn increases the lifespan of the catalyst and reactor vessel equipment, and reduces potential damage to CP due to hot spots, (3) increase cycle length, (4) increase yield by minimizing high residence-time areas, (5) decrease the pressure drop of G-V-L across the catalyst bed, (6) decrease fouling potential, (7) decrease potential for catalyst pinning, and (8) increase the reliability of the equipment which decreases the potential for loss of containment and migration of the catalyst to downstream equipment.

As set forth herein, the invention provides improvements to components of the reactor vessel which are designed to reduce or eliminate the problems associated with uneven flow distribution. In one aspect of the invention, modified scallops are provided. In another aspect of the invention, modified center pipes are provided. In another aspect of the invention, modified outer baskets are provided. The modified scallops may be used together with conventional center pipes known in the art, or they may be used with the modified center pipes disclosed herein. The modified outer basket may be used together with conventional center pipes known in the art, or they may be used with the modified center pipes disclosed herein. Likewise, the modified center pipes may be used together with conventional scallops known in the art, or they may be used with the modified scallops disclosed herein. Likewise, the modified center pipes may be used together with conventional outer baskets known in the art, or they may be used with the modified outer baskets disclosed herein.

Radial Flow Reactor

A cross-sectional view of the inside of a reactor vessel 100 is illustrated in FIG. 1A. In this embodiment, scallops 104 are used. The outermost surface of the reactor vessel 100 is an outer shell 102. Within the reactor vessel 100, a plurality of scallops 104 are arranged circumferentially around an inner wall 106 of the vessel 100. As illustrated, the back surface 108 of the scallops 104 are positioned directly adjacent to the inner wall 106, while the distribution surface 110 of the scallops 104 is exposed to the interior of the vessel 100. The scallops 104 are preferably held in place along the inner wall 106 of the vessel 100 by expander rings (not shown), although any known method of securing scallops within a reactor vessel may be used.

A cross-sectional view of an alternative reactor vessel 120 is illustrated in FIG. 1B. In this embodiment, an outer basket 116 is used instead of a plurality of scallops. The outer basket 116 is arranged circumferentially around the inner wall 106 of the vessel 120. As illustrated, the outer surface 118 of the outer basket 116 is positioned directly adjacent to the inner wall 106, while the distribution surface 122 of the outer basket 116 is exposed to the interior of the vessel 120. In this embodiment, a profile wire overlay 124, discussed more fully below, is installed inside of the outer basket 116. The outer basket 116 is preferably held in place along the inner wall 106 of the vessel 100 by cover deck assemblies or other mechanical solutions known in the art (not shown); any known method of securing outer basket within a reactor vessel may be used.

In either embodiment illustrated in FIG. 1A or 1B, directly adjacent to the distribution surface 110 of each of the scallops 104, or the outer basket 116, is at least one catalyst bed 112. The catalyst bed(s) 112 contains a catalyst. The reactor catalyst bed(s) 112 may be arranged individually in a side by side design or in a stacked design. Typically, the reactors are arranged in series, typically 3-4 catalyst beds 112, however they can also be arranged in parallel. In either arrangement, the catalyst beds 112 are either radial fixed beds or moving beds (fluidized or not fluidized).

At the center of the reactor vessel 100 or 120 is the center pipe 114. When the feedstock gas, such as naphtha, ammonia, or other G-V-L, flows down into the scallops 104 or the outer basket 116 and escapes through the openings therein, it comes into contact with the catalyst bed(s) 112, thus causing a reaction to take place. The feedstock G-V-L then flows into the center pipe 114 and out of the reactor vessel 100 or reactor vessel 120. The movement of the feedstock G-V-L into and out of the vessel 100 or vessel 120 at different rates can cause variances in pressure within the vessel 100 or vessel 120. In use, the feedstock should flow through the scallops 104 or the outer basket 116 into the catalyst bed 112 and then through the center pipe 114. In certain embodiments, the flow pattern of the feedstock may be opposite, but such flow patterns are not discussed in detail herein.

As set forth herein, modified scallops, modified outer baskets, and/or modified center pipes may each be utilized in a reactor vessel, such as those illustrated in FIGS. 1A and 1B. These components may be used together, or they may be used with other conventional reactor vessel components. Each of the modified components is discussed in detail below.

Modified Scallops

One aspect of the invention relates to a "modified" scallop (hereinafter referred to as a "scallop") for use in radial flow reactor vessels which improves G-V-L flow distribution through the reactor. A scallop according to various embodiments of the invention is illustrated in FIGS. 2A-G. The scallop utilizes openings having a modified size and/or shape along its length and width in order to adjust the flow distribution of the G-V-L through the reactor vessel. Generally, smaller openings are used where the G-V-L enters the scallop and scales to larger openings further from the G-V-L entry point in the vertical plane. This pattern can also be designed with larger openings where the G-V-L enters the scallop and scales to smaller openings further from the G-V-L entry point in the vertical plane. Generally, smaller openings are used where the scallop surface protrudes deepest into the adjacent catalyst bed and gradually increase to a larger gradient as the scallop nears the inside diameter of the reactor vessel creating a uniform G-V-L entry point in the horizontal plane, regardless of the vertical hole arrangement. The design is to create reasonably equivalent pressure drop across all openings along the length and along the width of the scallop body.

Scallops may be constructed of various geometries of an elongated conduit, typically having a "D"-shaped cross-section, which is where the name "scallops" originates. However, scallops may also have different cross sectional shapes, such as triangular or trapezoidal. They are typically formed of various metal construction which is manufactured into their desired shape. Suitable scallop designs are presented in U.S. Pat. Nos. 5,209,908, 5,366,704 and 6,224,838, and are incorporated herein by reference.

As illustrated in FIG. 2A, the scallop 200 has an inner surface 202 and an outer surface 204. The scallop 200 includes a plurality of openings 208 (see FIG. 2C) along its length and width that extend through the entire thickness of the scallop, from the inner surface 202 to the outer surface 204. The openings 208 allow the G-V-L flowing inside of the scallop 200 to outflow through the scallop, thus coming into contact with the catalyst bed contained in the reactor vessel. Specifically, when the G-V-L outflow through the openings 208 on the scallop 200, they come into contact with catalyst particles contained within an adjacent catalyst bed, thus causing a reaction to take place.

In the prior art, the openings in the scallop are generally of the same size and shape along the entire length of the scallop. These scallops have a tendency to cause a higher volume of G-V-L to outflow through the openings toward the top of the scallop, since the higher inflow pressure across the same size opening causes more G-V-L to flow, while a lesser volume of the G-V-L outflows through the openings toward the bottom of the scallop where pressure is lower. This creates an uneven G-V-L flow distribution through the scallop, thereby causing an uneven utilization of the catalyst.

As illustrated in FIG. 2A, however, the openings 208 toward the top end 210 of the scallop 200 have a smaller diameter than the openings 208 toward the bottom end 212 of the scallop 200. By way of a non-limiting example, the openings 208 toward the top end 210 of the scallop 200 may have a diameter of about 1 mm, while the openings 208 toward the bottom end 212 of the scallop 200 may have a diameter of about 75 mm. In this way, when the G-V-L enters the scallop 200, a lower volume outflows through the smaller openings 208 at the top end 210 of the scallop 200, while a relatively higher volume outflows through the larger openings 208 at the bottom end 212 of the scallop 200, since the larger openings constitute the path of least resistance. Thus, the scallop 200 can be used to manipulate the distribution of flow of G-V-L through the reactor vessel to optimize the catalyst reaction. An enlarged view of the openings 208, taken along line A of FIG. 2A, is illustrated in FIG. 2B.

In another embodiment illustrated in FIG. 2D, the openings 208 toward the top end 210 of the scallop 200 have a larger diameter than the openings 208 toward the bottom end 212 of the scallop 200'. By way of a non-limiting example, the openings 208 toward the bottom end 212 of the scallop 200' may have a diameter of about 1 mm, while the openings 208 toward the top end 210 of the scallop 200' may have a diameter of about 75 mm. In this way, when the G-V-L enters the scallop 200', a higher volume outflows through the larger openings 208 at the top end 210 of the scallop 200', while a relatively smaller volume outflows through the smaller openings 208 at the bottom end 212 of the scallop 200', since the larger openings constitute the path of least resistance. Thus, the scallop 200' can be used to manipulate the distribution of flow of G-V-L through the reactor vessel to optimize the catalyst reaction.

In yet another embodiment, the openings 208 may have a horizontal gradient pattern, as illustrated in FIG. 2C. Specifically, the openings 208 may have varying sizes along the width of the scallop 200, instead of along the length of the scallop 200 as is shown in FIGS. 2A and 2D. For example, the scallop 200 may have its largest openings on the sides 214 of the scallops, and smaller openings 208 closer to the center of the scallop 200, along the center line 216. In another embodiment, the openings 208 may be largest at the center line 216 of the scallop 200 and smallest at the sides 214 of the scallop 200. In this way, a more uniform volume of G-V-L will flow out of the sides and the front of the scallop 200, thus directing the G-V-L outflow more efficiently toward the catalyst bed.

In yet another embodiment, the openings 208 may increase and then decrease, or decrease and then increase, along the length of the scallop 200, or along the width of the scallop 200, such that there is a non-uniform change in the opening size from the top end 210 to the bottom end 212 and/or from the center line 216 to the sides 214 of the scallop.

In another embodiment, the spacing of the openings 208 may be modified to adjust the G-V-L flow distribution (not shown). In this embodiment, each of the openings 208 at and adjacent to the top end 210 of the scallop 200 may be spaced closer together, and have relatively larger opening size, to provide a larger total surface area of openings 208 to increase G-V-L outflow. On the other hand, at the bottom end 212 of the scallop 200, the openings 208 may be spaced farther apart, together with a relatively smaller opening size, so that the total surface area of openings 208 is lower at the bottom end 212 than at the top end 210 of the scallop 200. For example, the openings 208 at either the top end 210 or the bottom end 212 may be arranged such that each opening 208 is spaced about 0.5 mm-25 mm apart from an adjacent opening 208. Alternatively, the openings 208 at and adjacent to the top end 210 may be spaced farther apart, together with a relatively smaller opening size, so that the total surface area of the openings 208 is lower at the top end 210, as compared to the bottom end 212.

The same is true where the scallop 200 has a horizontal, as opposed to vertical, gradient pattern. In this embodiment, the openings 208 at the center line of the scallop 200 may be spaced farther apart from the openings 208 at the sides of the scallop 200, or vice versa.

The openings 208 on the scallop 200 are generally circular in shape, although any shape, such as square, rectangular, triangular, oval, oblong, or any other shape suitable for use in a particular application, may be used. In a preferred embodiments, the openings 208 are round in shape.

Figure 2E:
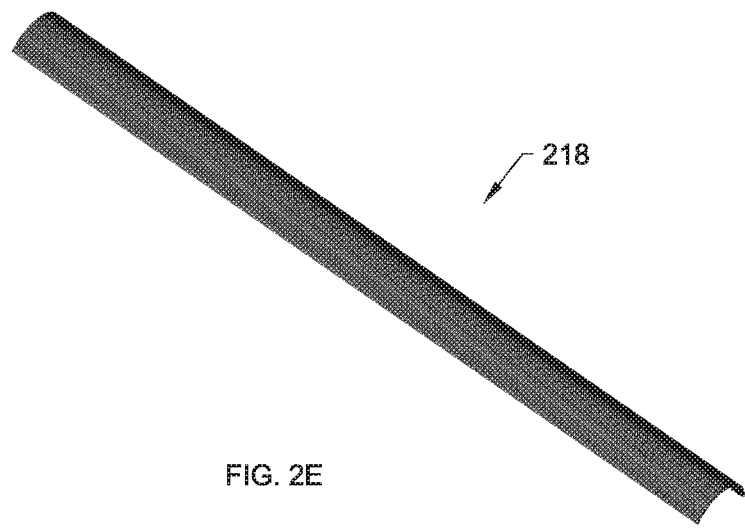
FIG. 2E is a perspective view of a profile wire scallop overlay for use with a scallop according to an embodiment of the invention.
Figures 2F, 2G:
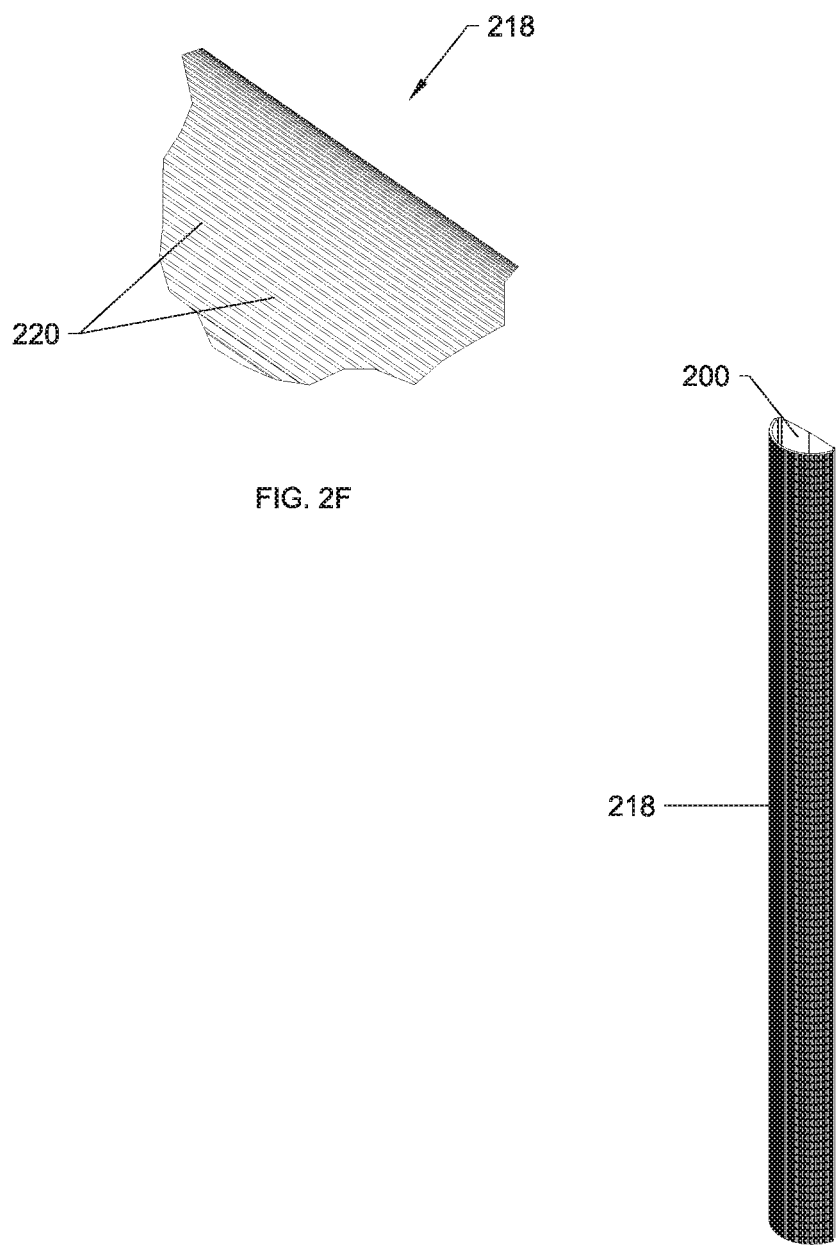
FIG. 2F is an enlarged view of the profile wire scallop overlay illustrated in FIG. 2E taken along line B.
FIG. 2G is a front perspective view of the scallop of FIG. 2A or FIG. 2D coupled to the profile wire scallop overlay of FIG. 2E, creating a scallop assembly according to an embodiment of the invention.

As illustrated in FIG. 2E-2G, the scallop 200 may be used together with profile wire scallop overlay 218, although it is not required according to the invention. The profile wire overlay 218 preferably has the same or similar shape as the scallop 200 and is configured to be placed over and coupled to the distribution surface of the scallop 200. The profile wire scallop overlay 218 may be coupled to the scallop 200 according to any known means, such as, for example, welding. A scallop 200 coupled to a profile wire scallop overlay 218 is illustrated in FIG. 2G, forming a complete scallop assembly.

As shown in FIG. 2F, the profile wire scallop overlay 218 preferably includes a plurality of slots 220 along its length, which may be configured vertically or horizontally depending upon the particular application. As shown in the enlarged view of FIG. 2F, taken along line B of FIG. 2E, the slots 220 are arranged vertically with respect to the elongated length of the profile wire scallop overlay 218. The profile wire scallop overlay 218 prevents catalyst particles from the adjacent catalyst bed from flowing into the scallops 200, while still allowing G-V-L to outflow from the scallops 200. The size, shape, and placement of the slots 220 on the profile wire scallop overlay 218 may also be modified, but such modifications will typically not dictate G-V-L flow pattern through the scallops 200. However, designs could be used to impact flow through the profile wire scallop overlay 218.

It should be noted that the scallop 200 and the profile wire scallop overlay 218 may have any size suitable for use in a particular application in a specific type of reactor vessel. In one embodiment, they may be about 1-25 meters long and have an overall width of about 10 cm-1 m, with the largest opening of the conduit being 10 cm-1 m (with reference to FIGS. 1A-1B, measured from the back surface 108 to the distribution face surface 110 of the scallop 104). Their size is not particularly limited, as it dictates the volume of G-V-L that can be passed through depending on the particular application.

The scallop 200 and the profile wire scallop overlay 218 may be formed of any material known to one skilled in the art, including, but not limited to, metals, ceramics, polymers, composites, and the like. In a preferred embodiment, they are formed of metal, preferably a metallic alloy, which is strong enough to withstand the elevated temperatures, pressures, catalyst movement and G-V-L flow rates inside the reactor vessel without deforming. For example, they may be formed of stainless steel. The material used to form the scallop 200 and/or the profile wire scallop overlay 218 is not particularly limited, as long as it has sufficient strength to withstand the operating conditions of the reactor. In one embodiment, although not required, the scallop 200 and/or the profile wire scallop overlay 218 may be provided with a coating or surface treatment, such as an anti-corrosion coating.

Modified Center Pipes

Another aspect of the invention relates to a "modified" center pipe (hereinafter referred to as a "center pipe") for use in radial flow reactor vessels which improves G-V-L flow distribution through the reactor. Center pipes according to various embodiments of the invention are illustrated in FIGS. 3A-D. The center pipe utilizes openings having a modified size and/or shape along its length in order to adjust the flow distribution of the G-V-L through the reactor vessel. Generally, smaller openings are used where the feedstock G-V-L enters the center pipe and scales to larger openings further from the G-V-L entry point, but the center pipe may also be designed with larger openings being used where the feedstock G-V-L enter the center pipe and scales to smaller openings further form the G-V-L entry point. The design is to create reasonably equivalent pressure drop across all openings up and down the center pipe.

Center pipes may be constructed of various geometries of an elongated conduit or cylinder. However, center pipes may also have different cross sectional shapes, such as triangular or trapezoidal. They are typically formed of various metal construction which is manufactured into their desired shape.

As shown in FIG. 3A, the center pipe 300 is an elongated conduit, such as a tube-shaped member, that has an inner surface 302 and an outer surface 304. In one embodiment, the center pipe 300 includes a plurality of openings 308 along its length that extend through the entire thickness of the center pipe 300, from the inner surface 302 to the outer surface 304. The openings 308 allow the G-V-L that have reacted with the catalyst bed 112 to flow into the interior of the center pipe 300 and out of the reactor vessel.

In prior art structures, center pipe openings are generally of the same size and shape along the entire length of the center pipe. As illustrated in FIG. 3A, however, the openings 308 toward the top end 310 of the center pipe 300 have a smaller diameter than the openings 308 toward the bottom end 312 of the center pipe 300. By way of a non-limiting example, the openings 308 toward the top end 310 of the center pipe 300 may have a diameter of about 0.1 mm, while the openings 308 toward the bottom end 312 of the center pipe 300 may have a diameter of about 75 mm. In this way, after the G-V-L reacts with the catalyst bed, a lower volume flows into the center pipe 300 at the top end 310 of the center pipe 300, while a relatively higher volume flows into the center pipe 300 at the bottom end 312 of the center pipe 300, since the larger openings constitute the path of least resistance. Accordingly, for the same reasons set forth above with respect to the scallops 200, uneven G-V-L flow through the catalyst bed can be minimized to improve reaction efficiency. An enlarged view of the openings 308 taken along line C of FIG. 3A is illustrated in FIG. 3B.

In an alternative embodiment, as illustrated in FIG. 3C, the openings 308 closer to the top end 310 of the center pipe 300' may be larger than the openings 308 closer to the bottom end 312 of the center pipe 300'. For example, the openings 308 toward the top end 310 of the center pipe 300' may have a diameter of about 75 mm, while the openings 308 toward the bottom end 312 of the center pipe 300' may have a diameter of about 0.1 mm. This embodiment is yet another mechanism by which to adjust G-V-L flow distribution within the reactor vessel 100. An enlarged view of the openings 308 taken along line D of FIG. 3C is illustrated in FIG. 3D.

In yet another embodiment, the openings 308 may increase and then decrease, or decrease and then increase, along the length of the center pipe 300, such that there is a non-uniform change in the opening size from the top end 310 to the bottom end 312 of the center pipe 300.

In yet another embodiment, the spacing of the openings 308 on the center pipe 300 may be modified to adjust the G-V-L flow distribution. In this embodiment, each of the openings 308 at and adjacent to the top end 310 of the center pipe 300 may be spaced closer together relative to the openings 308 near the bottom end 312, and have a larger opening size, in order to provide a larger total surface area of openings 308 to increase G-V-L flow into the center pipe 300. On the other hand, at the bottom end 312 of the center pipe 300, the openings 308 may be spaced farther apart, together with relatively smaller opening size, so that the total surface area of openings 308 is lower at the bottom end 312 than at the top end 310. Alternatively, each of the openings 308 at and adjacent to the top end 310 of the center pipe 300 may be spaced farther apart relative to the openings 308 near the bottom end 312 of the center pipe 300, and have a smaller opening size, in order to provide a smaller total surface area of openings at the top end 310. By way of a non-limiting example, the openings 308 at the top end 310 or the bottom end 312 may be arranged such that each opening 308 is spaced about 0.5 mm-25 mm apart from an adjacent opening 308.

As illustrated in FIGS. 3A-D, the openings 308 on the center pipe are generally circular in shape, although any shape, such as square, rectangular, triangular, oval, oblong, or any other shape suitable for use in a particular application, may be used. In a preferred embodiment, the openings are oval shaped.

In one embodiment, the scallop 200 as illustrated in FIG. 2A, may be utilized together with a conventional center pipe having uniform opening size. In another embodiment, the center pipe 300 and 300' having the varying opening size 308, as illustrated in FIGS. 3A and 3C, may be utilized together with a conventional scallop having uniform opening size. In yet another embodiment, each of the scallop 200 and center pipe 300 or 300' may be used together to optimize G-V-L flow distribution through the reactor vessel 100.

In another embodiment, the opening gradient on the center pipe could be configured to be opposite of the scallop 200 or outer basket 400, as set forth herein. If the scallop 200 and/or outer basket 400 has its smallest openings at the top, then the center pipe 300' would be used, having its largest openings at the top, and vice versa.

As illustrated in FIGS. 3E-G, a profile wire center pipe overlay 318 may be used together with the center pipe 300, although this is not required according to the invention. The profile wire center pipe overlay 318 functions to prevent the catalyst particles from the adjacent catalyst bed 112 from flowing into the center pipe 300. A profile wire center pipe overlay 318 positioned around the outer surface 304 of the center pipe 300 is illustrated in FIG. 3G.

As illustrated in FIG. 3F, the profile wire center pipe overlay 318 includes a plurality of slots 320 along its length, which may be configured vertically or horizontally depending upon the particular application. As shown in the enlarged view of FIG. 3F, which is taken along line E of FIG. 3E, the slots 320 are arranged vertically with respect to the length of the profile wire center pipe overlay 318. These slots 320 allow the G-V-L, which has passed through the catalyst bed 112, to flow into the center pipe 300 and out of the reactor vessel 100.

The profile wire center pipe overlay 318 may be formed of the same materials, and with the same coatings or surface treatments, as profile wire scallop overlay 218.

Modified Outer Basket

One aspect of the invention relates to a "modified" outer basket (hereinafter referred to as a "basket") for use in radial flow reactor vessels which improves G-V-L flow distribution through the reactor. The basket functions the same as the scallops 200 to direct G-V-L flow down the side of the reactor vessel and then radially across into the catalyst bed 112. A basket according to various embodiments of the invention is illustrated in FIGS. 4A-G. The basket utilizes openings having a modified size and/or shape along its length in order to adjust the flow distribution of the G-V-L through the reactor vessel, like the modified scallops 200. The design is to create reasonably equivalent pressure drop across all openings up and down the basket.

Baskets may be constructed of various geometries of an elongated conduit or cylinder. However, baskets may also have different cross sectional shapes, such as triangular or trapezoidal. They are typically formed of various metal construction which is manufactured into their desired shape.

As shown in FIG. 4A, the basket 400 is an elongated conduit, such as a tube-shaped member, that has an inner surface 402 and an outer surface 404. The basket 400 includes a plurality of openings 408 along its length that extend through the entire thickness of the basket, from the inner surface 402 to the outer surface 404. The openings 408 allow the G-V-L flowing along the exterior of the basket 400 to outflow through the basket 400, thus coming into contact with the catalyst bed 112 contained in the reactor vessel. The outer basket 400 can be used to manipulate the distribution of flow of G-V-L through the reactor vessel to optimize the catalyst reaction, similar to the scallops 200.

In the prior art, the openings in the basket are generally of the same size and shape along the entire length of the basket, typically constructed of profile wire. These baskets have a tendency to cause a higher volume of G-V-L to outflow through the openings toward the top of the basket, since the higher inflow pressure across the same size opening causes more G-V-L to flow, while a lesser volume of the G-V-L outflows through the openings toward the bottom of the basket where pressure is lower. This creates an uneven G-V-L flow distribution through the basket, thereby causing an uneven utilization of the catalyst. As illustrated in FIG. 4A, however, the openings 408 toward the top end 410 of the basket 400 have a smaller diameter than the openings 408 toward the bottom end 412 of the basket 400. By way of a non-limiting example, the openings 408 toward the top end 410 of the basket 400 may have a diameter of about 1 mm, while the openings 408 toward the bottom end 412 of the basket 400 may have a diameter of about 75 mm. In this way, when the G-V-L enters the basket 400, a lower volume outflows through the smaller openings 408 at the top end 410 of the basket 400, while a relatively higher volume outflows through the larger openings 408 at the bottom end 412 of the basket 400, since the larger openings constitute the path of least resistance. Thus, the basket 400 can be used to manipulate the distribution of flow of G-V-L through the reactor vessel to optimize the catalyst reaction. An enlarged view of the openings 408 taken along line F of FIG. 4A is illustrated in FIG. 4B.

In an alternative embodiment illustrated in FIG. 4C, the openings 408 toward the top end 410 of the basket 400' have a larger diameter than the openings 408 toward the bottom end 412 of the basket 400'. By way of a non-limiting example, the openings 408 toward the top end 410 of the basket 400' may have a diameter of about 75 mm, while the openings 408 toward the bottom end 412 may have a diameter of about 1 mm. In this way, when the G-V-L enters the basket 400', a higher volume outflows through the larger openings 408 at the top end 410, while a relatively smaller volume outflows through the smaller openings 408 at the bottom end 412, since the larger openings constitute the path of least resistance. Thus, the basket 400' can be used to manipulate the distribution of flow of G-V-L through the reactor vessel to optimize the catalyst reaction. This embodiment is yet another mechanism by which to adjust G-V-L flow distribution within the reactor vessel 100. An enlarged view of the openings 408 taken along line G of FIG. 4C is illustrated in FIG. 4D.

In yet another embodiment, the openings 408 may increase and then decrease, or decrease and then increase, along the length of the outer basket 400, such that there is a non-uniform change in the opening size from the top end 310 to the bottom end 312 of the center pipe 300.

In another embodiment, the spacing of the openings 408 may be modified to adjust the G-V-L flow distribution. For example, each of the openings 408 at and adjacent to the top end 410 of the basket 400 may be spaced closer together relative to the openings 408 near the bottom end 412 of the basket 400, and have a relatively larger opening size, in order to provide a larger total surface area of openings 408 to increase G-V-L outflow. On the other hand, at the bottom end 412 of the basket 400, the openings 408 may be spaced farther apart, together with relatively smaller opening size, so that the total surface area of openings 408 is lower at the bottom end 412 than at the top end 410 of the basket 400. By way of a non-limiting example, the openings 408 at the top end 410 or the bottom end 412 may be arranged such that each opening 408 is spaced about 0.5 mm to 25 mm apart from an adjacent opening 408. Alternatively, the openings 408 at and adjacent to the top end 410 may be spaced farther apart relative to the openings near the bottom end 412, and have a relatively smaller opening size, in order to provide a smaller total surface area of openings 408 at the top end 410.

The openings 408 on the basket 400 or 400' are generally circular in shape, although any shape, such as square, rectangular, triangular, oval, oblong, or any other shape suitable for use in a particular application, may be used. In a preferred embodiments, the openings 408 are circular in shape.

Figure 4E:
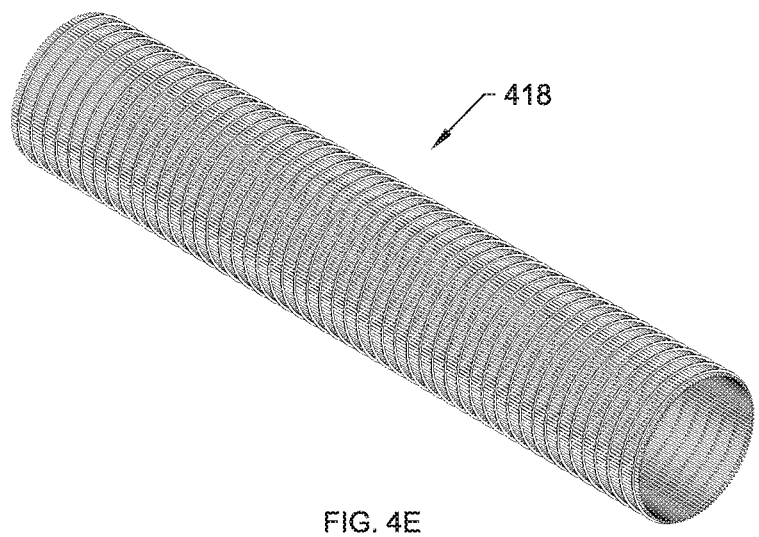
FIG. 4E is a perspective view of a profile wire outer basket overlay for use with an outer basket according to an embodiment of the invention.
Figure 4G:
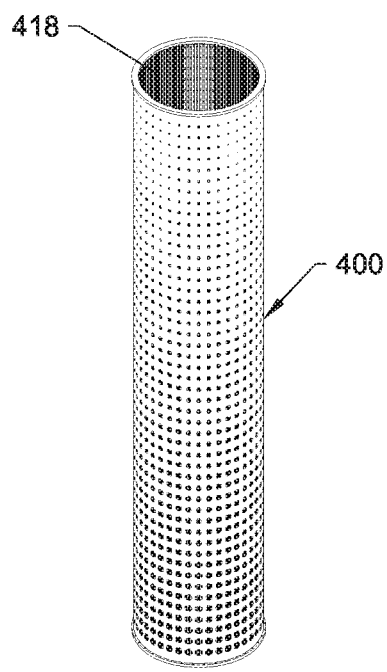
FIG. 4G is a perspective view of the profile wire outer basket overlay of FIG. 4D installed inside of the outer basket of FIG. 4A or FIG. 4C according to an embodiment of the invention.
Figure 4F:
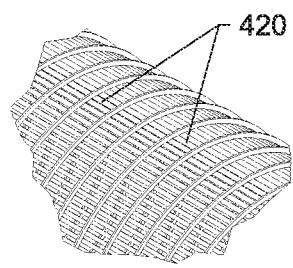
FIG. 4F is an enlarged view of the profile wire outer basket overlay illustrated in FIG. 4E, taken along line H.

In another embodiment, as illustrated in FIGS. 4E-G, a profile wire outer basket overlay 418 may be used together with the basket 400 or 400', although it is not required according to the invention. The profile wire outer basket overlay 418 preferably has the same or similar shape as the basket 400 or 400' and, in one embodiment, is configured to be placed into the inner diameter and coupled to the inner surface 402 of the basket 400, as illustrated in FIG. 4G. The profile wire outer basket overlay 418 may be coupled to the basket 400 according to any known means, such as, for example, welding. The profile wire overlay 418 preferably includes a plurality of slots 420 along its length, which may be configured vertically or horizontally depending upon the particular application. As shown in the enlarged view of FIG. 4F, taken along line H of FIG. 4E, the slots 420 are arranged vertically with respect to the elongated length of the profile wire outer basket overlay 418. The profile wire outer basket overlay 418 prevents catalyst particles from the adjacent catalyst bed from flowing into the basket 400, while still allowing G-V-L to outflow from the basket 400. The size, shape, and placement of the slots 420 on the profile wire outer basket overlay 418 may also be modified, but such modifications will typically not dictate G-V-L flow pattern through the basket 400. However, designs could be used to impact flow through the profile wire outer basket overlay 418.

It should be noted that the basket 400 and the profile wire outer basket overlay 418 may have any size suitable for use in a particular application in a specific type of reactor vessel. In one embodiment, the basket may be about 1-25 meters long and have an overall bed penetration (smaller I.D.) of about 10 cm-1 m. Their size is not particularly limited, as it dictates the volume of G-V-L that can be passed through depending on the particular application.

The basket 400 and the profile wire outer basket overlay 418 may be formed of any material known to one skilled in the art, including, but not limited to, metals, ceramics, composites, and the like. In a preferred embodiment, they are formed of metal, preferably a metallic alloy, which is strong enough to withstand the elevated temperatures, pressures and G-V-L flow rates inside the reactor vessel without deforming. For example, they may be formed of stainless steel. The material used to form the basket 400 and/or the profile wire outer basket overlay 418 is not particularly limited, as long as it has sufficient strength to withstand the operating conditions of the reactor. In one embodiment, although not required, the basket 400 and/or the profile wire outer basket overlay 418 may be provided with a coating or surface treatment, such as an anti-corrosion coating.

Although this invention has been described in connection with specific forms and embodiments thereof, it will be appreciated that various modifications other than those discussed above may be resorted to without departing from the spirit or scope. For example, equivalent elements may be substituted for those specifically shown and described, certain features may be used independently of other features, and in certain cases, particular locations of elements may be reversed or interposed, all without departing from the spirit or scope as defined in the appended Claims.

What is claimed is:

1. A scallop for use in a radial flow reactor, comprising:
   an elongated conduit having a top end and an opposing bottom end and a rounded distribution side;
   a plurality of openings formed in the elongated conduit through a thickness thereof,
   wherein a diameter of the plurality of openings progressively increases or decreases from the top end to the opposing bottom end of the elongated conduit so as to allow a feedstock to flow uniformly out of the scallop through the plurality of openings; and
   a profile wire scallop overlay positioned on the rounded distribution side of the elongated conduit to prevent catalyst particles from flowing into the scallop.

2. The scallop of claim 1, wherein the plurality of openings are generally circular, square, rectangular, triangular, oval, or oblong in shape.

3. The scallop of claim 1, wherein the elongated conduit is formed of stainless steel.

4. The scallop of claim 1, wherein the elongated conduit has a back side and with the rounded distribution side forms a "D"-shaped cross section.

5. The scallop of claim 4, wherein the radial flow reactor includes a reactor vessel, and the back side of the elongated conduit engages an inner wall of the reactor vessel.

6. The scallop of claim 5, wherein the rounded distribution side is exposed to an interior of the reactor vessel adjacent to a catalyst bed.

7. The scallop of claim 1, wherein the feedstock flows radially through the plurality of openings in the elongated conduit of the scallop to come into contact with a catalyst bed in order to effect a reaction.

8. A radial flow reactor comprising a scallop according to claim 1.

9. A radial flow reactor, comprising:
   a center pipe comprising,
   an elongated conduit having a top end and an opposing bottom end; and
   a plurality of openings formed in the elongated conduit through a thickness thereof,
   wherein a diameter of the plurality of openings progressively increases or decreases from the top end to the opposing bottom end of the elongated conduit so as to allow a feedstock to flow uniformly into the center pipe through the plurality of openings; and
   at least one scallop according to claim 1 engaging a wall of the reactor.

10. The reactor of claim 9, wherein the plurality of openings are generally circular, square, rectangular, triangular, oval, or oblong in shape.

11. The reactor of claim 9, wherein the elongated conduit is formed of stainless steel.

12. The reactor of claim 9, wherein includes a reactor vessel, and the center pipe is positioned in the center of the reactor vessel adjacent to a catalyst bed.

13. The reactor of claim 12, wherein the feedstock flows radially through the catalyst bed in order to effect a reaction and into the center pipe through the plurality of openings to be removed from the reactor vessel.

14. The reactor of claim 9, further comprising a profile wire center pipe overlay positioned around an outer surface of the elongated conduit of the center pipe to prevent catalyst particles from flowing into the center pipe.

15. An outer basket for use in a radial flow reactor, comprising:
   an elongated conduit having a top end and an opposing bottom end;
   a plurality of openings formed in the elongated conduit through a thickness thereof,
   wherein a diameter of the plurality of openings progressively increases or decreases from the top end to the opposing bottom end of the elongated conduit so as to allow a feedstock to flow uniformly out of the outer basket through the plurality of openings; and
   a profile wire outer basket overlay coupled to an inner surface of the elongated conduit to prevent catalyst particles from flowing into the outer basket.

16. The outer basket of claim 15, wherein the plurality of openings are generally circular, square, rectangular, triangular, oval, or oblong in shape.

17. The outer basket of claim 15, wherein the elongated conduit is formed of stainless steel.

18. The outer basket of claim 15, wherein the radial flow reactor includes a reactor vessel, and wherein the elongated conduit is arranged circumferentially around an inner wall of the reactor vessel, such that an outer surface of the elongated conduit is positioned directly adjacent to the inner wall of the reactor vessel.

19. The outer basket of claim 18, wherein a distribution surface of the elongated conduit is exposed to an interior of the reactor vessel.

20. The outer basket of claim 15, wherein the feedstock flows radially through the plurality of openings in the elongated conduit to come into contact with a catalyst bed in order to effect a reaction.

21. A radial flow reactor comprising an outer basket according to claim 15.

* * * * *